United States Patent [19]

Cure et al.

[11] Patent Number: 4,853,134
[45] Date of Patent: Aug. 1, 1989

[54] HEAT SENSITIVE SHUT-OFF DIVERTER VALVE

[75] Inventors: Richard L. Cure, Stratton; David A. Meyer, Aurora, both of Colo.

[73] Assignee: Water Purification Systems, Inc., Stratton, Colo.

[21] Appl. No.: 126,751

[22] Filed: Nov. 30, 1987

[51] Int. Cl.[4] ............... C02F 1/00; G05D 23/00
[52] U.S. Cl. ................... 210/742; 210/149; 236/93 A
[58] Field of Search ........... 210/149, 742; 236/93 R, 236/93 A; 165/33, 40

[56] References Cited

U.S. PATENT DOCUMENTS

| | | |
|---|---|---|
| 877,399 | 1/1908 | Brissenden . |
| 2,396,138 | 3/1946 | Vernet ............ 297/4 |
| 2,636,776 | 4/1953 | Vernet ............ 297/6 |
| 2,813,683 | 11/1957 | Pillman ........... 236/93 A |
| 3,540,422 | 11/1970 | Kelly ............. 123/117 |
| 3,756,083 | 9/1973 | Tatsutomi et al. .... 73/368 |
| 3,841,551 | 10/1974 | Ota .............. 236/86 |
| 3,887,159 | 6/1975 | Obermaier et al. .... 251/11 |
| 4,036,433 | 7/1977 | Wagner et al. ...... 236/100 |
| 4,128,203 | 12/1978 | Maltby ........... 236/100 |
| 4,218,317 | 8/1980 | Kirschmann ....... 210/117 |
| 4,296,770 | 10/1981 | Rice ............. 137/62 |
| 4,306,966 | 12/1981 | Lucia ............ 210/149 X |
| 4,460,006 | 7/1984 | Kolze ............ 137/62 |
| 4,541,448 | 9/1985 | Kolze ............ 137/62 |

Primary Examiner—William E. Wayner
Attorney, Agent, or Firm—Kinney & Lange

[57] ABSTRACT

A valve including a heat sensitive actuator which operates to close the valve when the temperature of the fluid flowing therethrough exceeds a predetermined value but which may be quickly restored to operable condition by flowing a cooling fluid around the actuator.

20 Claims, 2 Drawing Sheets

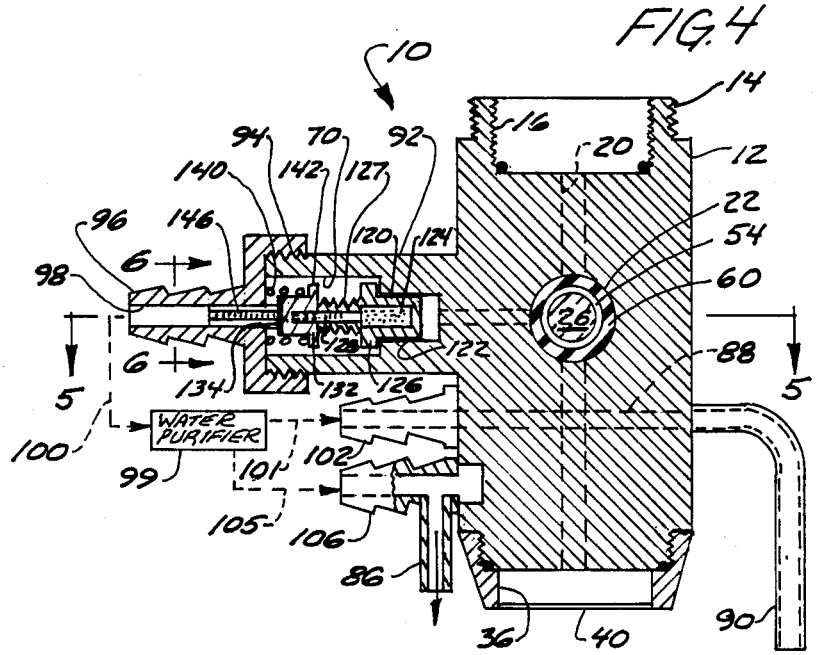
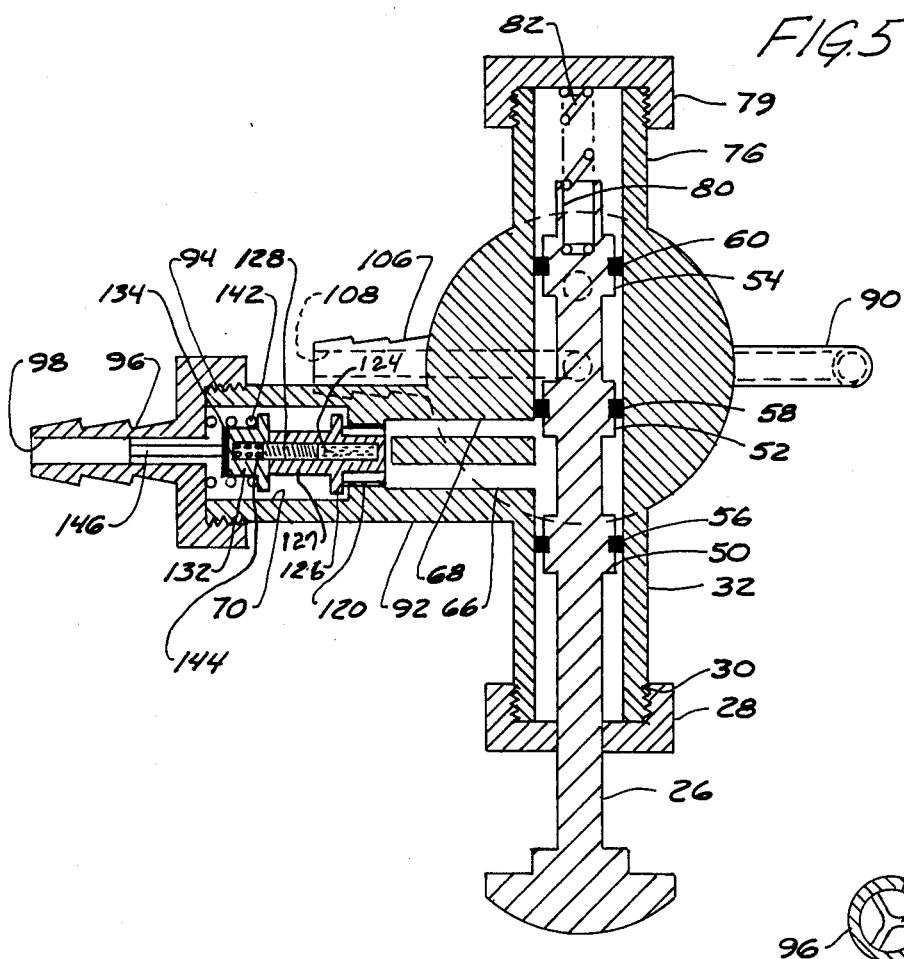
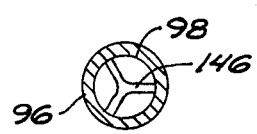

HEAT SENSITIVE SHUT-OFF DIVERTER VALVE

BACKGROUND OF THE INVENTION

1. Field of the Invention.

The present invention relates to valves and more particularly to a diverter valve operable to switch the flow of a fluid from a first output to a second output and, when the fluid exceeds a predetermined temperature during its flow in the second output, a heat sensitive actuator operates to shut off such flow. Means are provided for subsequent application of a cooling fluid to the heat sensitive member to restore it to its open position when desired. The invention is particularly well adapted for use with a water purification device connected to a water faucet to provide, in a first condition, a flow of unpurified tap water, and in a second condition to divert the water to the purification device. Since some water purifiers can be damaged by high temperature water, the valve will sense a damaging temperature and shut off the flow to protect the purifier but, after the water is again at a safe temperature, the valve may be quickly opened to resume purifying.

2. Description of the Prior Art.

It is quite common to provide valves which close when the temperature increases beyond a certain point. For example, in the Kolze U.S. Pat. Ser. No. 4,541,448, a heat sensitive shut-off valve is shown which utilizes an expanding wax that operates in connection with a piston and a cup to close an opening when the wax melts due to the application of heat. A description of an expansible material that operates under high temperatures to expand and actuate a valve is shown in the Vernet U.S. Pat. Ser. No. 2,636,776. A number of other patents likewise show temperature responsive valves in general, but none of them have provided any way of quickly cooling the temperature responsive actuator so that the valve may be rapidly reopened to permit normal operation.

SUMMARY OF THE INVENTION

The present invention provides a system for supplying cooling liquid to the temperature responsive actuator of a valve subsequent to it being shut off due to excessive temperature conditions to thereby permit a rapid reopening thereof when the temperature conditions are again in the normal range.

The valve has special utility and will be described in connection with a conventional home hot and cold water faucet and a water purifier, such as a reverse osmosis device, connected thereto in order to supply purified water to the user when desired. Since excessive heat can cause damage to water purifiers, particularly of the reverse osmosis type, the invention is provided with a heat sensitive material which operates to close the flow of water to the purifier when the temperature increases above a predetermined level. Having once been shut off, the valve will remain off for the duration of the high temperature condition so that continued flow of excessively hot water to the water purifier will not occur. When, however, the overheated condition has been corrected, it may be desirable to rapidly reactivate the system and, accordingly, the present invention provides apparatus which, after the water is again cool enough, operates to divert such water to the heat sensitive actuator until it cools sufficiently to reopen the valve and resume flow to the water purifier.

BRIEF DESCRIPTION OF THE DRAWINGS

FIG. 4 is a cross section of the valve taken through the temperature sensitive actuator;

FIG. 5 is a cross sectional view taken along lines 5—5 of FIG. 4; and

FIG. 6 is a cross sectional view taken along lines 6—6 of FIG. 4.

DETAILED DESCRIPTION OF THE PREFERRED EMBODIMENTS

Figure 1:
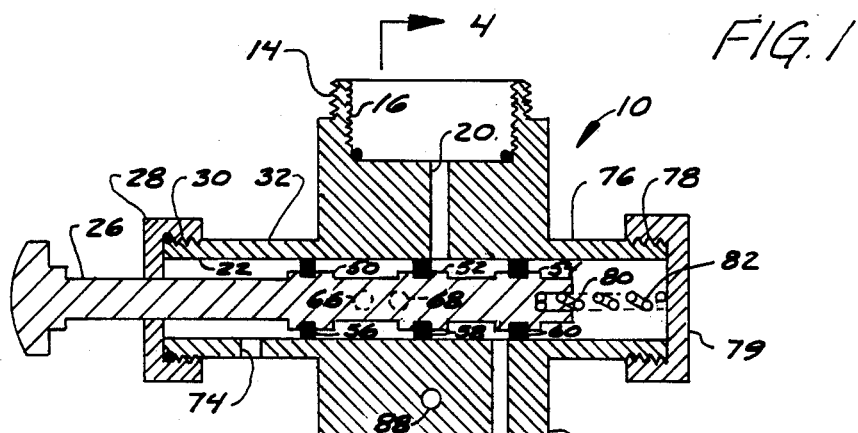
FIG. 1 is a cross section of the valve assembly taken along the longitudinal axis of the valve spool and showing flow through the valve in a first position of the stem.

Throughout the figures, reference numerals referring to common elements will be the same.

Figure 2:
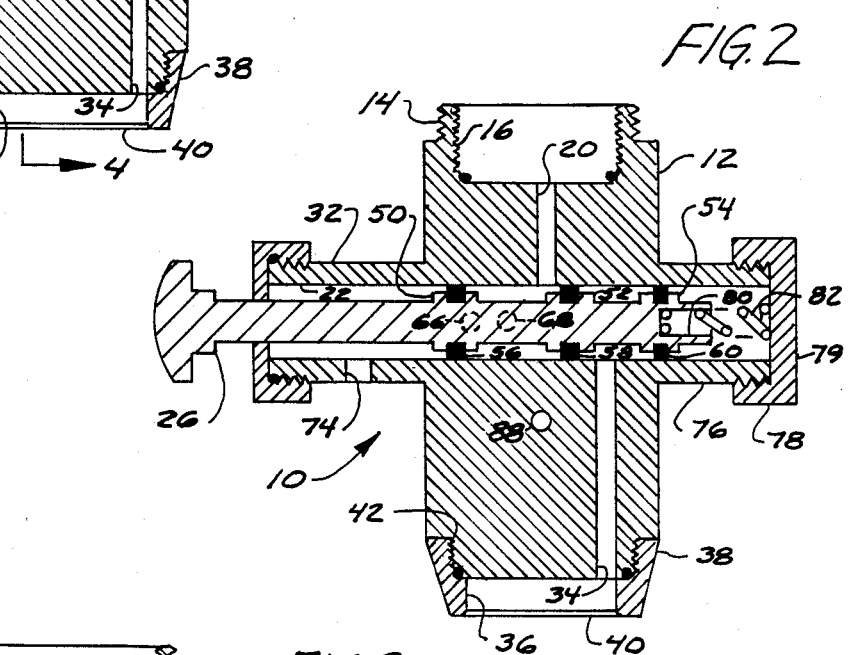
FIG. 2 is a cross section like FIG. 1 but showing the flow through the valve when the valve spool is in a second position.
Figure 3:
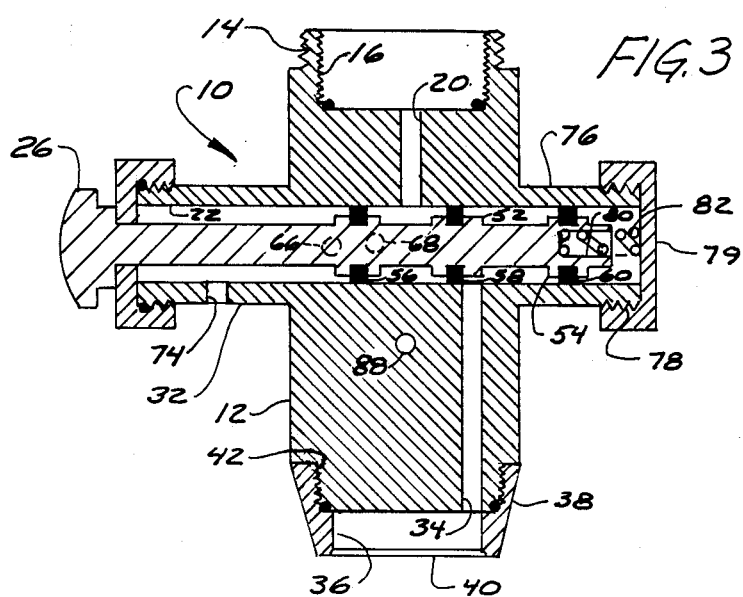
FIG. 3 is a cross section like FIGS. 1 and 2 showing the flow through the valve when the spool is in a third position.

In FIGS. 1, 2 and 3, a valve 10 is shown comprising a valve housing 12 having a threaded nipple 14 on the upper end for connection to a fluid source such as water from a home sink faucet (not shown). From the source, fluid may flow into the valve through an entrance passage 16 and a first port 20 formed in the housing 12.

Port 20 exits into a slide valve chamber 22 in which a slide valve spool 26 is shown with a stem portion passing through a first end cap 28 threaded onto a nipple 30 in a leftwardly extending portion 32 of housing 12.

Valve chamber 22 has a second port 34 extending downwardly through housing 12 into an exit passage 36 capped with a cap 38 having a filter screen 40 and threaded onto a nipple 42 on the lower end of housing 12.

Slide valve spool 26 has a plurality of circular lands 50, 52 and 54 thereon upon which sealing members such as O-rings 56, 58 and 60, respectively, are held. In the first position shown in FIG. 1, O-ring 58 is shown slightly to the left of port 20 and O-ring 60 is shown slightly to the right of port 34 to thereby permit fluid (water) flow from passageway 16 through port 20 and around valve spool 26 between O-rings 58 and 60 to port 34 and out passageway 36 through screen 40. This permits direct flow of water out the nozzle when the faucet is turned on.

When the valve spool 26 is pushed to the right in FIG. 1, it will next come to a position shown in FIG. 2 where O-ring 58 is now slightly to the right of port 20 and to the left of port 34 so that fluid may no longer flow out port 34. A pair of ports 66 and 68, shown in phantom, intersect the valve chamber 22 and exit to a fluid chamber 70, seen in FIGS. 4 and 5. In FIG. 2, fluid may now flow from passageway 16 through port 20 and around valve spool 26 between O-rings 56 and 58 to exit through ports 66 and 68 into the chamber 70.

When valve spool 26 is pushed further to the right, it will next come to a position shown in FIG. 3 where O-ring 58 has now moved to the position just to the left of port 34 and O-ring 56 has moved to a position between ports 66 and 68. In this position, fluid can flow from passageway 16 through port 20 and around valve spool 26 between O-rings 56 and 58 to port 68, but not to port 66. As a result, and as will be explained hereinafter, the fluid going into chamber 70 may now exit through port 66 where it will again pass around valve spool 26 to the left of O-ring 56 and may now exit through a port 74 formed in the lower part of the leftward extending portion 32.

In FIGS. 1, 2 and 3, a rightwardly extending portion 76 of housing 12 is shown having a threaded nipple 78 on to which an end cap 79 is threaded.

The right end of the sliding valve spool 26 is shown having a cup-shaped chamber 80 into which a compression spring 82 is fitted, the other end of which bears against the inside surface of the cap 79. Spring 82 should be chosen to have a compression force which allows the valve spool 26 to stay in the positions shown in FIG. 1 and FIG. 2 with the frictional forces caused by O-rings 56, 58 and 60 holding the valve stem against the force of spring 82. Spring 82, however, will have enough compression force so that when valve spool 26 is pushed to the position shown in FIG. 3 then, if not held there, it will return the valve spool 26 to the position shown in FIG. 2. This permits fluid to flow into port 68 and out of port 66 only so long as the valve stem 26 is held in the position shown in FIG. 3.

A flow-through port or passageway 88 is also shown in the figures for purposes of providing a path for the flow of the purified water from the purifier through the housing 12 and out through an exit dispensing tube 90 shown in FIGS. 4 and 5.

Referring now to FIGS. 4 and 5, the heat expansible actuator for shutting off flow to the water purifier will be seen.

As seen in FIGS. 4 and 5, the chamber 70 formed in a leftwardly extending portion 92 of housing 12 has a threaded nipple 94 on the left end thereof onto which a hose barb carrying end cap 96, having a hose barb thereon, has been threaded. End cap 96 has an opening 98 extending through the hose barb from chamber 70 so that in the normal position shown in FIGS. 4 and 5 fluid may flow from chamber 70 out of port 98 through an attached hose or conduit shown by dashed line 100 to a fluid (water) purifying device 99, such as a reverse osmosis water purifier, a silver impregnated purifier or a carbon filter unit. Also, the purifier could be a unit which uses an iodine impregnated resisn for purifying. The details of construction of the water purifying device is not critical to the present invention. Such a water purifying device has a purified water output line shown as dashed line 101 connected to a hose barb or nipple 102 shown in figure 4 connected to the passageway 88 described in connection with the earlier figures and which connected to the purified water dispensing tube 90. Thus, when the valve stem 26 is in the position shown in FIG. 2, fluid passes from the entrance passageway 16 through the port 20, around the valve spool 26, through the ports 66 and 68 to the chamber 70, and out the port 98 to the water purifier 99 and from the water purifier 99 to the hose barb 102 and the port 88 to dispensing tube 90 and used as desired for drinking and cooking purposes. Dispensing tube 90 may be pivotable or flexible so as to dispense purified water at any desired a position.

The water purifier 99, such as a reverse osmosis unit, normally will also include a flush fluid output of waste water that may be connected by a conduit shown as dashed line 105 to a flared nipple 106 having a discharge passageway 86 on the exterior of the valve. Waste water will thus be made to flow into a sink adjacent the valve. Discharging the waste water outside of the valve body eliminates the possibility of back pressure from the flow of unpurified water through the unit causing the waste water to flow back into the purifier.

Chamber 70 contains a thermo sensitive actuator casing 120 fitted within a aperture 122 of chamber 70 and having spaces formed so that fluid may flow therearound from ports 66 and 68 to chamber 70. The casing can have a few ribs on the outside to center the casing while permitting flow past the casing. Casing 120 contains a heat expansible material 124 such as a wax containing powdered metal heat conducting material and a binder, as is common in the prior art. Casing 120 has a flange 126 loosely bearing against the edge of the cup-shaped aperture 122 and an extension 127 containing a small plunger or piston 128, the other end of which is slidably fitted into a recess in a movable valve member 132 which has a seal 134 on the outer end thereof. The seal is normally held away from the opening 98 by a spring 140 which bears against a flange 142 of valve member 132 and the inner surface of the hose barb carrying end cap 96. The chamber in valve member 132 has a small diameter spring 144 therein that is stronger than spring 140 and normally provides space for movement of the plunger 128 after the valve sealing member 134 has seated, as will be explained.

A fluted slider guide member 146, best seen in FIG. 6, is attached to the valve member 132 and slidingly fits into the opening 98 of the hose barb on cap 96. As such, it will be seen that fluid may flow between the sealing member 134 and through the opening 98 along the longitudinal flow areas formed by the slider member 146. However, when the heat expansible material 124 expands under the influence of higher temperatures, the piston member 128 will be moved to the left acting to move valve member 132 and seal member 134 to compress spring 140 until the sealing member 134 closes the opening 98 thereby shutting off the flow of fluid to the purifier unit to protect it from the high temperatures. The spring 144 does not compress initially, but provides space for plunger 128 to move as the wax expands more if extremely high temperatures are encountered. If desired, the seal member 134 can be made very thick so it will compress a substantial amount, which would eliminate the need for spring 140.

A positive shutoff of flow of hot water is provided and this is preferred to diverting the hot flow back to the sink because waste water also gives rise to the possibility of sink overflow if there is a drainage problem. Furthermore, by having the flow shut off at a valve above the sink, rather than remotely at the purifier for example, problems with leakage causing flooding are limited because any such leakage will discharge down the sink drain. The positive closure will continue so long as the expansible material 124 remains expanded which, in the prior art, could take a considerable time period and thus would prevent the use of the purifier even after the temperature of the fluid has been lowered to a safe value.

In the present invention, when the overheated condition is discovered, the operator will pull the valve spool 26 to its far left position (FIG. 1) so tap water comes out the exit opening, and will adjust the water from the faucet until it is cool. He will then push the valve stem 26 to the far right position (FIG. 3) at which time the now cool water will flow into chamber 70 because the position of O-ring 56 between ports 68 and 66 (FIG. 3), around the casing 120 and then back out through port 66 to be emptied into the sink through the exhaust port 74 seen in FIGS. 1-3. The flow of cool water past casing 120 causing rapid contraction of the heat expandable material to bring the valve member 134 back to a retracted position under spring load in a minimum amount of time.

In operation, when the apparatus is in the position shown in FIG. 1, water from the faucet will flow through passage 16 and out passage 36 without the water being purified. Such unpurified water may be used, for example, for washing. When purified water is desired, for example for drinking, the valve spool 26 is moved to the position shown in FIG. 2, and fluid will now flow through passage 16, ports 20, 66 and 68, into chamber 70 and out port 98 to be purified, and thereafter returned through the line 105, hose barb 106 and passageway 86. If an overheating condition occurs, the expansible material 124 will cause a closure of the opening 98 to prevent the hot fluid from flowing to the purifying device and all flow will terminate. After rectifying the over heated condition, the operator may speed the resumption of normal purifying operation by pushing the valve spool 26 to the position shown in FIG. 3. Now, the cooler water will flow from entrance passage 16 through ports 20 and 68 into fluid chamber 70 and around the casing 120 to cool material 124 and exit through ports 66 and 74 to the sink. Under the cooling effect of the flowing cooler water, the expansible material 124 will rapidly contract so as to open the port 98 and allow the fluid to thereafter flow, as before, to the water purifier.

It is thus seen that the present invention provides a valve which is closable upon the application of excessive heat to thereby protect downstream water purifying apparatus, such as a reverse osmosis unit, and yet to provide for quick recovery and reuse of the apparatus after correction of the over heated condition. The valve also can be closed to prevent wasting water and minimize the possibility of flooding. Waste water is discharged directly through a hose barb which prevents back up into the purifier and thus the quality of the purified water is assured.

Combining of the heat sensor with the water diverter valve unit also gives more utility. The two features combined give protection from leaking from build-up of pressure in the purifying device 99 and of course provides the ability to introduce the cooling water to open the shut-off valve in a place which is convenient and easy to get to.

In some situations, such where there is a high temperature air and a low shut-off temperature, in order to protect some reverse osmosis membranes such as cellulose acetate, which can withstand temperatures only in the range of 80° to 90° F., one may have to apply cool water to the heat sensitive element before one could run water to the purifier.

Silver impregnated fluid purifiers will leech and lose the silver if hot water is run through them. A straight carbon unit will purge the chemicals when hot water is run through giving a 'chemical soup'. An iodine impregnated resin, used for sterilization of drinking water would give up an excessive amount of iodine when run with hot water, thus most purification systems (except distilling processes) benefit from the high temperature shut-off.

Although the present invention has been described with reference to preferred embodiments, workers skilled in the art will recognize that changes may be made in form and detail without departing from the spirit and scope of the invention.

What is claimed is:

1. Temperature responsive valve means comprising:
a first chamber having an entrance passage, exit passage and first and second ports;
fluid directing means in the first chamber movable to first and second positions;
a second chamber connected to the first and second ports and having an output port; and
heat sensitive means in the second chamber operable to close the output port upon the occurrence of a predetermined temperature value, the fluid directing means in the first position operable to direct fluid from the entrance passage through the first chamber and into the first port to the second chamber where the fluid passes the heat sensitive means and flows out through the output port when the temperature of the fluid is below the predetermined value and subsequent to the occurrence of the predetermined temperature in the second position to direct fluid from the entrance passage through the first chamber and into the first port to the second chamber where the fluid passes the heat sensitive means and flows out the second port to the first chamber and from the first chamber to the exit passage thereby cooling the heat sensitive means and speeding the opening of the output port.

2. Apparatus according to claim 1 wherein the first chamber has an output passage and the fluid directing means has a third position to direct the fluid from the entrance passage through the first chamber to the output passage.

3. Apparatus according to claim 1 including a fluid purifier having an input and wherein the output port is connected to the input of a purifier, the predetermined temperature being the temperature which could damage the purifier.

4. Apparatus according to claim 3 wherein the valve means has a fluid flowthrough port, the purifier has a pure fluid output and including conduit means connecting the pure fluid output to the fluid flowthrough port.

5. Apparatus according to claim 4 further including discharge tube means connected to the first flowthrough port to dispense purified fluid.

6. Apparatus according to claim 3 wherein the valve means has a waste flowthrough port, the purifier has a waste fluid output and including conduit means connecting the waste fluid output to the waste flowthrough port.

7. Apparatus according to claim 6 wherein the purifier is a reverse osmosis device.

8. Apparatus according to claim 1 wherein the output port is connected to a purifier, the predetermined temperature being the temperature which could damage the purifier.

9. Apparatus according to claim 8 wherein the entrance passage is connected to a source of water and the purifier is a water purifier.

10. Apparatus according to claim 9 wherein the water purifier is a reverse osmosis purifier having a purified water output.

11. Apparatus according to claim 10 wherein the valve means has a water flowthrough passage and the purified water output is connected thereto.

12. Apparatus according to claim 9 wherein the water purifier is a reverse osmosis purifier having a waste water output.

13. Apparatus according to claim 12 wherein the valve means has a waste flowthrough passage and the waste water output is connected thereto.

14. Temperature responsive valve means comprising:
a first elongated chamber having an entrance passage, an exit passage, a first port and a second port;
elongated valve stem means slidably mounted in the chamber and having first and second chamber sealing means thereon operable to prevent fluid flow in the chamber therepast;
an exit chamber connected to the first and second ports and having an output port; and
heat sensing means in the exit chamber operable when the temperature sensed exceeds a predetermined value to close the output port, the stem means in a first position locating the first sealing means on a first side of the entrance passage and the second sealing means on a first side of the first port to permit fluid flow therebetween, the stem means in a second position locating the first sealing means on the first side of the entrance passage and the second sealing means on the first side of the first port and between the first and second ports to permit fluid flow from the second port to the exit passage, when the stem means is in the first position and the temperature is below the predetermined value, a first fluid flow path is open from the entrance passage through the elongated chamber between the first and second sealing means out the first port to the exit chamber past the heat sensing means and out the output port, when the stem means is in the first position and the temperature is above the predetermined temperature, the heat sensing means operates to close the output port and block the first path, when the stem means is in the second position a second fluid flow path is open from the entrance passage through the elongated chamber between the first and second sealing means out the first port to the exit chamber past the heat sensing means out the second port back to the elongated chamber and out the exit passage, the second path being operable to conduct heat away from the heat sensing means to open the first output port.

15. Apparatus according to claim 14 wherein the elongated chamber has an output passage and the stem means has a third position, in the first and second positions of the stem means, the first sealing means being located between the entrance passage and the output passage to prevent fluid flow therebetween, in the third position, the stem means locating the first sealing means on a second side of the entrance passage to prevent fluid flow between the entrance passage and the first port and permit fluid flow between the entrance passage and the output passage.

16. The method of protecting a purifier from damage wherein the purifier has a component carrying fluid flow which is damaged by excessive fluid temperature by stopping fluid flow thereto when the fluid has excessive temperature, and resuming fluid flow thereto rapidly when the excessive temperature is reduced, comprising the steps of:
passing a fluid to the purifier through a valve port prior to reaching the component, which valve port is closable by a heat sensing device in the fluid flow so that when the temperature of the fluid is excessive, the valve port is closed and flow to the purifier stopped;
bringing the temperature of the fluid below the excessive temperature; and
passing the lowered temperature fluid past the sensing device to conduct heat away therefrom to rapidly open the port.

17. The method of claim 16, wherein the component carrying fluid flow which is damaged by excessive fluid temperature comprises a reverse osmosis filter, and including the step of placing the filter in the flow path downstream from the valve port.

18. For use in combination with a water purifying device which utilizes means that can become damaged within the range of temperatures below boiling of water, and which utilizes water from a source, the improvement comprising valve means for coupling the source to the water purifying device, a heat sensitive element in said valve means and positioned to sense the temperature of the fluid flowing from the source to the fluid purifier, and a separate valve in said valve means coupled to the source and movable by the temperature sensitive means when the temperature exceeds a predetermined level to shut off flow from the source to the fluid purifier.

19. The apparatus as specified in claim 18 wherein said valve means comprises a housing, said valve means further comprising a second valve having a discharge opening, a source inlet, and a second valve movable to position independently of the first mentioned valve means to selectively divert fluid flow from the source to the outlet opening, power from the source to the purifier and past the heat sensitive means.

20. The apparatus of claim 19, wherein said last mentioned valve means is movable to a position to divert fluid from the source to be in temperature communication with the temperature sensitive means when the first mentioned valve is closed to prevent fluid from flowing to the fluid purifier.

* * * * *